United States Patent Office 3,541,791
Patented Nov. 24, 1970

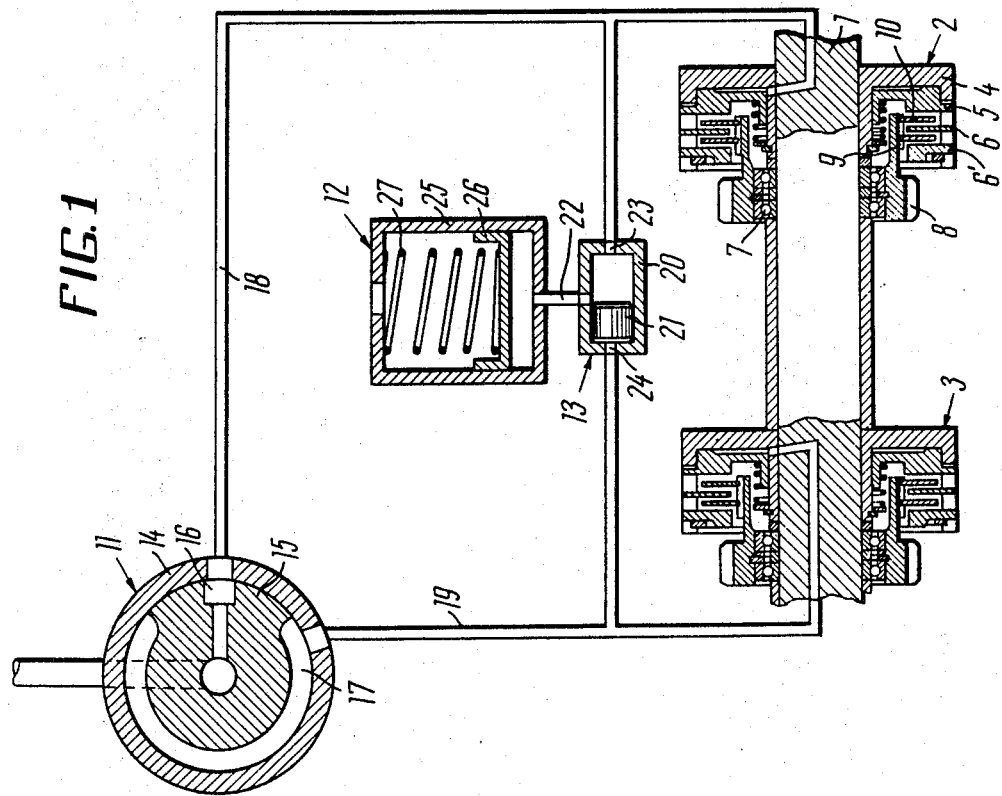

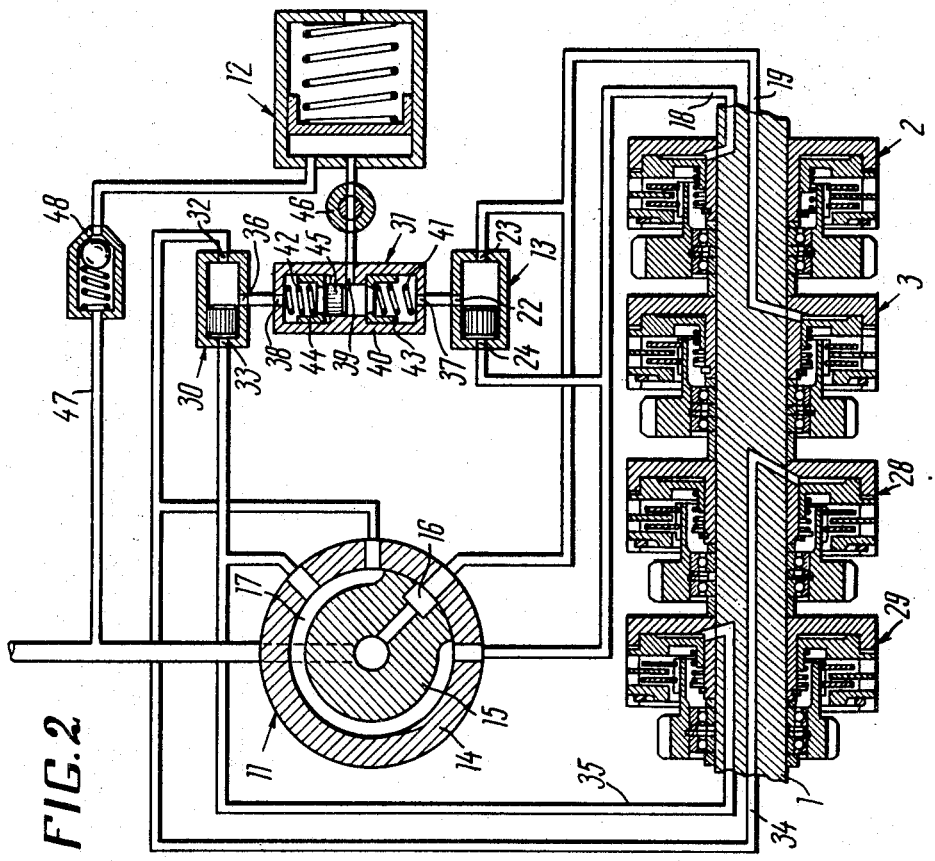

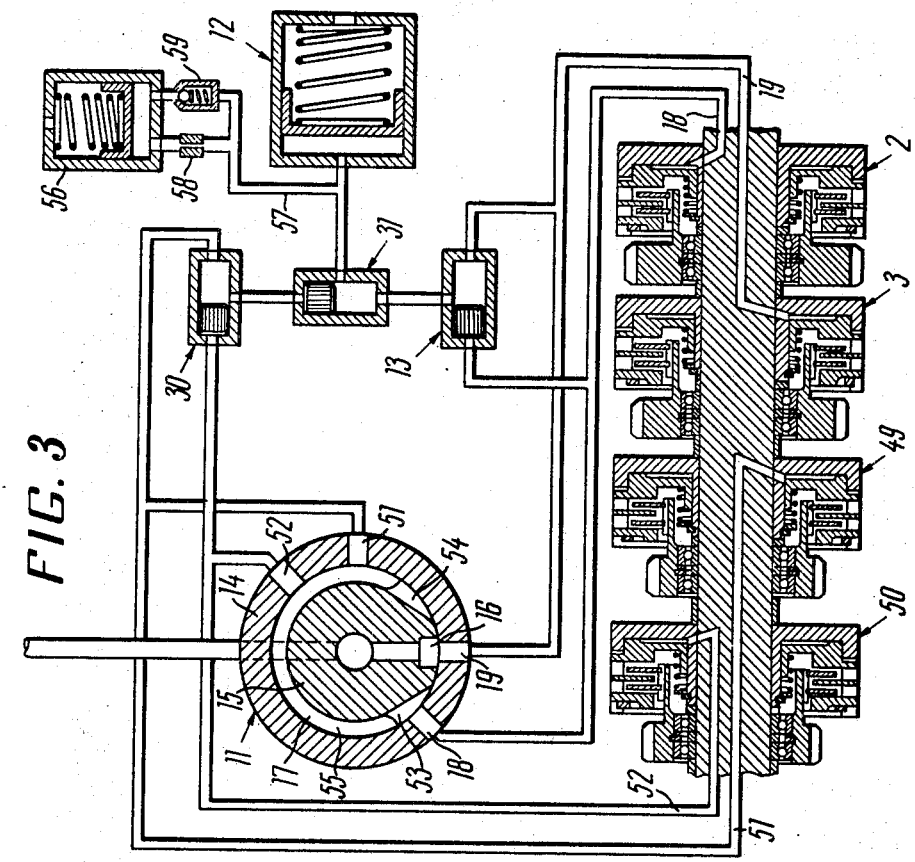

3,541,791
HYDRAULIC DEVICE FOR CONTROLLING THE ACTUATING CYLINDERS OF THE GEARSHIFT FRICTION CLUTCHES AND BRAKES OF SELF-PROPELLED VEHICLES, MAINLY TRACTORS
Kiva Yakovlevich Lvovsky, Naberezhnaya, Novikova-Priboya 8, korpus 1, kv. 53, and Nikolai Alexandrovich Scheltsyn, Skakovaya ulitsa 18, kv. 19, both of Moscow, U.S.S.R.
Filed Sept. 6, 1968, Ser. No. 757,869
Int. Cl. F15b 1/02; F16d 25/10
U.S. Cl. 60—51
5 Claims

ABSTRACT OF THE DISCLOSURE

A hydraulic device is provided for controlling actuating cylinders of gearshift friction clutches and brakes of self-propelled vehicles such as tractors. The device comprises actuating cylinders for the gearshaft friction clutches and brakes hydraulically connected by main channels through a working fluid distributor. A hydraulic accumulator is connected to the main channels via a hydraulic change-over valve which incorporates a floating change-over element in a body having a middle channel providing communicating between the chamber of the hydraulic accumulator and the middle part of the change-over valve chamber, and two end channels providing communication between the main channels with the end portions of the change-over valve chamber. Consequently, the fluid pressure moves the change-over element and the hydraulic accumulator is put in communication with that main channel in which the pressure is higher than in the other channels.

---

The present invention relates to gearboxes of self-propelled vehicles and more specifically to hydraulic devices for controlling actuating cylinders of gearshift friction elements.

Most successfully this invention can be utilized in tractors.

Known in the art are hydraulic devices for controlling actuating cylinders of gearshift friction elements which comprise a hydraulic distributor for the working fluid, said distributor being connected by the main channels to the actuating cylinders of the friction clutches and brakes, and a hydraulic accumulator installed in the pressure line in front of the distributor. Said hydraulic accumulator is intended to accelerate the filling of the actuating cylinders being engaged. To ensure the continuity of the power transmission through the gearbox in the course of gearshifting, said device incorporates a valve which shuts off for a short time the drainage of the fluid from the disengaged actuating cylinders.

However, if the drain holes or valves of the actuating cylinders of the friction clutches and brakes are constantly opened, said device does not ensure the continuity of power transmission during gearshifting since the actuating cylinders are emptied through said holes or valves even with the drainage line shut-off.

An additional control valve is installed in the distributor of said devices for the purpose of reversing the machine.

An object of the present invention resides in providing a hydraulic device for controlling the actuating cylinders of the gearshift friction clutches and brakes of self-propelled vehicles, which ensure the continuity of power transmission during gearshifting in one direction for various designs of the actuating cylinders, for example for the actuating cylinders with constantly opened drain holes or valves.

Another object of the invention resides in increasing the operational dependability of the gearbox.

In accordance with these and other objects, there is provided a hydraulic device for controlling the actuating cylinders of the gearshift friction elements of self-propelled vehicles, particularly tractors, by means of a distributor connected by the main channels to the actuating cylinders of the friction elements, and by means of a hydraulic accumulator. According to the invention, there is at least one hydraulic change-over valve installed between the hydraulic accumulator and the main channels; the body of said change-over valve accommodating a floating change-over element and having channels of which the middle one communicates the hydraulic accumulator cavity with the middle part of the change-over valve chamber and the two end ones located on either side of the middle channel communicate the main channels with the end portions of the change-over valve cavity. As the pressure of the working fluid in the hydraulic change-over valve moves the change-over element, the hydraulic accumulator cavity is put in communication with the main channel, in which the pressure is higher than in the other channels.

If there are several actuating cylinders working in succession from one hydraulic accumulator, the device has to be provided with additional hydraulic change-over valves whose middle channels communicate with the hydraulic accumulator cavity and the end channels with the central channels of the main hydraulic change-over valves.

In order to control the duration of simultaneous operation of the engaged and disengaged actuating cylinders during gearshifting, it is practicable to install springs on both sides of the floating change-over element in at least one of the hydraulic change-over valves.

To control the gearboxes incorporating a quick-reversing mechanism, it is preferable that the channel of the rotatable control valve of the distributor which communicates the main channels with the return line should be made with a varying cross section. The cross section area of that part of the channel which communicates the disengaged actuating cylinders with the return line during reversing is larger than that of the channel portion which communicates the disengaged cylinders with the return line during gearshifting in one direction of running.

To ensure smooth reversing, it is preferable to install an additional hydraulic accumulator communicating with the main hydraulic accumulator.

The hydraulic device realized in accordance with this invention ensures the continuity of power transmission during gearshifting in one direction of running, and smooth reversing of of the machine.

Given below is a detailed description of the invention by way of example with reference to the accompanying drawing in which:

FIG. 1 is a diagrammatic sectional view of the hydraulic device for controlling two actuating cylinders of the gearshift friction elements in self-propelled vehicles, according to the invention;

FIG. 2 shows the same controlling four actuating cylinders but incorporating springs in one of the hydraulic changeover valves, according to the invention; and FIG. 3 is a diagrammatic sectional view of the hydraulic device with an additional hydraulic accumulator, according to the invention.

Installed on a shaft 1 (FIG. 1) in the gearbox are friction clutches 2 and 3. Each friction clutch incorporates a body 4 of an actuating cylinder rigidly mounted on the shaft 1, a piston 5 sliding in the actuating cylinder body 4, and discs 6 installed in the body 4 in such a manner that they can move axially but cannot rotate with respect to the body 4. The axial movement of the discs 6 is limited by a supporting disc 6' secured immovably in the body 4.

Gears 8 installed on bearings 7 on the shaft 1 have splines 9 which carry discs 10. The actuating cylinders of the friction elements 2 and 3 are controlled by means of the hydraulic device comprising a hydraulic distributor 11, a hydraulic accumulator 12 and a hydraulic change-over valve 13. Said hydraulic device is part of the hydraulic control system consisting of a pump, filter bypass valve and other elements which are omitted in the drawings.

The hydraulic distributor 11 comprises a body 14 and a rotatable control valve 15; the latter has a delivery channel 16 communicating with the pump of the hydraulic control system, and a drain channel 17. The distributor 11 is in communication with the actuating cylinders of the friction clutches 2 and 3 through the main channels 18 and 19.

Installed between the main channels 18 and 19 on the one hand and the hydraulic accumulator 12 on the other is the hydraulic change-over valve 13 whose body 20 accommodates a floating piston 21 and has a middle channel 22 and two end channels 23 and 24 located on either side of the middle channel 22, in the ends of the body 20.

The end channels 23 and 24 may be located in other parts of the body 20, but an imperative requirement is that they should be located on different sides from the middle channel 22. The middle channel 22 communicates the hydraulic accumulator cavity 12 with the middle part of the change-over valve cavity 13 whereas the end channels 23 and 24 communicate the end portions of said change-over valve cavity 13 with the main channels 18 and 19. As the floating piston 21 moves in the body 20, one of the end channels 23 or 24 is in communication with the middle channel 22 while the other is disconnected from it.

The hydraulic accumulator 12 consists of a body 25 accommodating a piston 26 with a spring 27.

If there are four successively operating actuating cylinders of the friction clutches 2, 3, 28 and 29 (FIG. 2), the hydraulic device has the main hydraulic change-over valves 13 and 30 and an additional change-over valve 31 which allows four actuating cylinders to be connected to a single hydraulic accumulator 12.

The side channels 23, 24, 32 and 33 of the main change-over valves 13 and 30 are connected with the main channels 18, 19, 34 and 35 while the central channels 22 and 36 are connected to the side channels 37 and 38 of the additional change-over valve 31. The central channel 39 of the additional change-over valve 31 is connected to the hydraulic accumulator 12.

The body 40 of the additional hydraulic change-over valve 31 accommodates springs 41 and 42 in movable sleeves 43, 44 whose bottom plates have holes for the passage of the working fluid. The springs 41 and 42 actuate a floating piston 45 via movable sleeves 43 and 44 or bear against the projections on the walls of the body 40.

A cock 46 installed between the hydraulic accumulator 12 and the additional hydraulic change-over valve 31 is used for emergency disengagement of all the actuating cylinders of the friction elements.

A connecting channel 47 located between the hydraulic accumulator 12 and the pressure channel 16 has a non-return valve 48 which passes the working fluid in one direction only, that is from the hydraulic accumulator 12 to the delivery channel 16.

The friction clutches 2, 3 of the gearbox engage during the forward speeds while friction clutches 49 and 50 (FIG. 3) engage during the reverse-running speeds. The main channels 18, 19, 51 and 52 are housed in the body 14 of the hydraulic distributor 11 not in a uniform order. The distance between the channels 18 and 19 connected to the actuating cylinders of the forward-running friction clutches 2 and 3 is equal to that between the channels 51 and 52 connected to the actuating cylinders of the reverse-running friction clutches 49 and 50. The distance between the channels 19 and 51 is twice that between the channels 18 and 19. Owing to this arrangement of the main channels in the body of the distributor 11, the middle position of the delivery channel 16 of the rotatable control valve between the main channels 19 and 51 ensures disengagement of all the actuating cylinders, that is, the neutral position in the gearbox. The drain channel 17 of the rotatable control valve 15 of the distributor 11 has a varying cross section. The portions 53 and 54 of the channel 17 having a smaller cross section are located near the pressure channel 16, on both sides thereof. The portion 55 of the channel 17 with a larger cross section interconnects the portions 53 and 54.

The hydraulic device for smooth reversing of the vehicle is fitted with an additional hydraulic accumulator 56 communicating via a channel 57 with the main hydraulic accumulator 12. Installed in the channel 57 are a restriction 58 and non-return valve 59 passing the working fluid in one direction only, that is, from the additional hydraulic accumulator 56 to the main accumulator 12.

The hydraulic device functions as follows:

When a certain speed, e.g., the 1st speed, is selected by the driver, the rotatable control valve 15 (FIG. 1) is set to a position in which the pressure channel 16 is in communication with the main channel 18 whereas the main channel 19 is communicated with the return line by means of the drain channel 17. The pump forces the working fluid through the pressure channel 16 and main channel 18 into the actuating cylinder of the friction clutch 2 and, moving the piston 5, fills up said actuating cylinder. In this case the piston 5 presses the discs 6 and 10 towards the supporting disc 6' owing to which the friction clutch transmits the torque from the shaft 1 via the actuating cylinder body 4, the discs 6 and 10 to the gear 8 and further, via the power transmission units omitted in the drawings, to the driving wheels.

The pressure of the working fluid in the main channel 18 moves the floating piston 21 of the hydraulic change-over valve 13 in the body 20 to a position in which the main channel 18 is put into communication with the hydraulic accumulator 12 through the end channel 23 and middle channel 22. Being actuated by the pressure of the working fluid the piston 26 compresses the spring 27 and the accumulator 12 is charged.

While shifting the gears, the driver sets the rotatable control valve 15 to such a position in which the pressure channel 16 is in communication with the main channel 19 while the main channel 18 is disconnected from the pressure channel 16 and is connected to the drain channel 17. The working fluid is forced by the pump through the distributor 11 and the main channel 19 to the actuating cylinder of the friction clutch 3. The friction clutch 3 starts transmitting torque not exactly at the moment of movement of the control valve 15, but, after a certain period of time within which the actuating cylinder is filled that is, the moving piston 5 takes up the clearances between the discs 6 and 10. Within this period of time, the hydraulic accumulator 12 is discharged and delivers the working fluid into the actuating cylinder of the friction clutch 2 and, through the main channel 18 and drain channel 17, into the return line. While being discharged, the hydraulic accumulator 12 maintains a pressure in the actuating cylinder of the friction clutch 2 which is lower than the maximum pressure but is sufficient for the friction clutch 2 to work without slipping. After the actuating cylinder of the friction clutch 3 becomes filled with fluid, the discs 6 and 10 become pressed against the supporting disc 6' and the fluid pressure in the main channel 19 and the actuating cylinder rises sharply. As soon as the pressure in the main channel 19 climbs higher than the pressure maintained by the dydraulic accumulator 12 in the main channel 18, the hydraulic change-over valve 13 operates which means that the floating piston 21 moves due to a difference of pressures, disconnects the main channel 18 from the hydraulic accumulator 12 and connects the main channel 19 to it. The actuating cylinder of the friction clutch 2 is emptied through the main channel 18 and drain channel 17 and the friction clutch 2 is disengaged. The hydraulic accumulator 12 is filled through the main channel 19.

Thus, the delay of the friction clutch to be disengaged in the engaged position for a certain period of time is ensured by the hydraulic accumulator 12 and this delay is discontinued in due time by the hydraulic change-over valve 13.

In view of the fact that the hydraulic accumulator supplies working fluid to the disengaged actuating cylinder, this delay is ensured also for the actuating cylinders with constantly opened drain holes or valves.

The process of gear-shifting in the gearbox with four successively operating friction clutches proceeds analogously to the process disclosed above. However, in certain cases two change-over valves can operate simultaneously.

For example, when the friction clutch 3 is changed for the friction clutch 28, the hydraulic change-over valves 30 and 31 operate. The additional change-over valve 31 operates a little earlier than the moment when the pressures in the main channels 19 and 34 become equalized because during the movement of the floating piston 45, the force of pressure of the fluid in the main channel 34 is added to the force of the spring 42.

At the same time, the spring 41 via the movable sleeve 43 bears against the projections of the walls of the body 40 and offers no resistance to the disconnection of the main channel 19 from the hydraulic accumulator 12. During the reverse change-over (from the friction clutch 28 to the friction clutch 3) the force of pressure in the main channel 19 is added to the force of the spring 41. Thus, the installation of the springs into the hydraulic change-over valve reduces the duration of simultaneous operation of the engaged and disengaged friction clutches during gear shifting. By adjusting the force of the springs, it is possible to reach the optimum conditions of gear shifting in various self-propelled vehicles.

While the gears are being shifted, the fluid pressure in the delivery channel 16 drops somewhat for the time of filling of the actuating cylinder to be engaged. In this case the hydraulic accumulator is discharged through the connecting channel 47 into the pressure channel 16 which speeds up the process of filling of the actuating cylinder being engaged. After the gears have been shifted, the hydraulic accumulator is isolated from the pressure channel by the non-return valve 48.

All the actuating cylinders can be disengaged instantaneously by means of the mechanically-controlled (that is by a pedal), cock 46 upon depressing the pedal, as the cock 46 disconnects the hydraulic accumulator 12 from all the main channels. If this is accompanied by setting the control valve 15 of the distributor 11 to neutral (in which position all the main channels communicate with the return line), all the friction elements will be disengaged instantaneously (without delay).

In the gearbox incorporating a quick-reversing mechanism, the processes of gear shifting in one direction of running proceed in complete analogy with the above described processes. For example, when shifting from the 1st speed to the 2nd speed of forward running (from the friction clutch 3 to the friction clutch 2), the main hydraulic accumulator 12 is discharged through the small-diameter portion 54 of the drain channel 17. When shifting from the 1st speed to the 2nd speed in the reverse running (from the friction clutch 49 to the friction clutch 50) the main hydraulic accumulator 12 is discharged through the portion 53 of the drain channel 17, said portion being also of a smaller diameter. The spring of the additional hydraulic accumulator 56 is selected so that said additional accumulator 56 is not discharged while the main accumulator 12 is being discharged.

While the vehicle is being reversed, for example when the gears are shifted from the 1st speed of forward running to the 1st speed of reverse running, the main channel 19 being disconnected is connected to the return line by that portion 55 of the drain channel 17 which has a larger cross section area. Due to this, the main hydraulic accumulator 12 is discharged faster than in the case when the gears are shifted in one direction of running. The volume of the hydraulic accumulator 12 is selected so that it is completely emptied through the portion 55 of the drain channel. Following the main accumulator, the additional hydraulic accumulator 56 becomes fully discharged through the non-return valve 59 and restriction 58.

Owing to the complete discharge of both hydraulic accumulators the transmission of power is interrupted in the gearbox and this interruption lasts until the actuating cylinder of the friction clutch 49 being engaged is completely filled after which pressure in this actuating cylinder rises smoothly because at first the additional hydraulic accumulator 56 is filled through the restriction 58 (the non-return valve 59 being closed) then the main hydraulic accumulator 12 is filled.

The hydraulic device can also be used when gears are shifted jointly by the friction clutches, and friction brakes (for example, in planetary gearboxes).

What we claim is:

1. A hydraulic device for controlling actuating cylinders of gearshift friction clutches and brakes of self-propelled vehicles, mainly tractors, said device comprising actuating cylinders for the gearshift friction clutches and brakes; a working fluid distributor; main channels hydraulically communicating said actuating cylinders with said distributor; a hydraulic accumulator; at least one hydraulic change-over valve installed between said hydraulic accumulator and said main channels, said valve including a body incorporating a floating change-over element therein, and provided with three channels including a middle channel communicating the chamber of the hydraulic accumulator with the middle part of the change-over valve chamber and two end channels located on either side of the middle channel and communicating the main channels with the end portions of the change-over valve chamber such that as the fluid pressure moves the change-over element in the change-over valve body, the hydraulic accumulator is put in communication with that main channel, in which the pressure is higher than in the other channels.

2. A hydraulic device, according to claim 1, comprising, in case of a number of actuating cylinders successively operating from one hydraulic accumulator, additional change-over valves whose middle channels communicate with the hydraulic accumulator while the end channels communicate with the middle channels of the main change-over valves.

3. A device, according to claim 1, wherein at least one of the change-over valves includes springs located on both sides of the floating change-over element thereof.

4. A device, according to claim 1, wherein in the working fluid distributor the channel of the rotatable control valve communicating the main channels with the return line has a verying cross section area, which is larger in that portion which communicates the actuating cylinders being disengaged with the return line during reversing of the vehicle than in the portion which communicates with the return line the disengaged actuating cylinders during gear shifting in one direction of running.

5. A device, according to claim 4, wherein smooth reversing is ensured by providing an additional hydraulic accumulator communicating with the main accumulator.

References Cited

UNITED STATES PATENTS

| 2,306,418 | 12/1942 | Wilson | 192—87.13 XR |
| 2,463,325 | 3/1949 | Slomer. | |
| 2,706,027 | 4/1955 | Ragland | 192—87.13 XR |
| 3,078,673 | 2/1963 | Browning et al. | 60—51 |

EDGAR W. GEOGHEGAN, Primary Examiner

U.S. Cl. X.R.

91—413; 192—87.15, 87.18